United States Patent
Wakahara et al.

[19]

[11] Patent Number: 6,102,831
[45] Date of Patent: Aug. 15, 2000

[54] SYSTEM FOR CONTROLLING ENGAGING AND DISENGAGING OPERATIONS OF RELEASABLE COUPLING DEVICE PLACED IN AUTOMOTIVE POWER TRAIN

[75] Inventors: Tatsuo Wakahara, Kawasaki; Chusaku Udagawa, Yokohama, both of Japan

[73] Assignee: Nissan Motor Co., Ltd., Kawasaki, Japan

[21] Appl. No.: 09/056,668

[22] Filed: Apr. 8, 1998

[30] Foreign Application Priority Data

Apr. 16, 1997 [JP] Japan .................................. 9-099164

[51] Int. Cl.$^7$ ............................. B60K 41/02; F16H 61/14
[52] U.S. Cl. ............................................. 477/169; 477/84
[58] Field of Search .................................. 477/169, 175, 477/181, 54, 62, 64, 83, 84, 180; 192/3.31

[56] References Cited

U.S. PATENT DOCUMENTS

| | | | |
|---|---|---|---|
| 4,484,497 | 11/1984 | Hibino | 477/169 |
| 4,623,053 | 11/1986 | Nishikawa | 477/169 |
| 4,923,042 | 5/1990 | Yamabe et al. | 477/54 |
| 4,957,194 | 9/1990 | Sawa et al. | 477/169 |
| 5,609,551 | 3/1997 | Sakai | 477/168 |
| 5,620,394 | 4/1997 | Iizuka | 477/168 |
| 5,649,881 | 7/1997 | Iizuka | 477/169 |
| 5,655,996 | 8/1997 | Ohtsuka | 477/175 X |
| 5,667,458 | 9/1997 | Narita et al. | 477/169 |
| 5,743,828 | 4/1998 | Kuriyama et al. | 477/169 |

FOREIGN PATENT DOCUMENTS

| | | |
|---|---|---|
| 0 668 184 | 8/1995 | European Pat. Off. . |
| 44 16 701 | 11/1994 | Germany . |
| 5-141526 | 6/1993 | Japan . |
| 7-229525 | 8/1995 | Japan . |
| 8-21526 | 1/1996 | Japan . |
| 8-226501 | 9/1996 | Japan . |

*Primary Examiner*—Sherry L. Estremsky
*Attorney, Agent, or Firm*—Foley & Lardner

[57] ABSTRACT

A releasable coupling control system in combination with an electronic engine control unit executable a fuel cutoff mode during vehicle deceleration and re-startable a fuel-supply recovery mode as soon as an engine speed drops below a predetermined threshold value, for controlling engaging and disengaging operations of a releasable coupling device placed in an automotive power train between an engine and drive wheels, comprises a wheel-speed sensor for detecting a drive-wheel speed to generate a drive-wheel speed indicative signal, and a controller being configured to be responsive to the drive-wheel speed indicative signal for moderately releasing the releasable coupling device at a moderate turn-off mode when the drive-wheel speed indicative signal value drops below a first predetermined value, and for quickly releasing the releasable coupling device at a quick turn-off mode when the drive-wheel speed indicative signal value drops below a second predetermined value.

8 Claims, 7 Drawing Sheets

SYSTEM FOR CONTROLLING ENGAGING AND DISENGAGING OPERATIONS OF RELEASABLE COUPLING DEVICE PLACED IN AUTOMOTIVE POWER TRAIN

The contents of Application No. TOKUGANHEI 9-99164, filed Apr. 16, 1997, in Japan is hereby incorporated by reference.

BACKGROUND OF THE INVENTION

1. Field of the Invention

The present invention relates to a control system for controlling engaging and disengaging operations of a releasable coupling device such as a computer-controlled clutch placed in an automotive power train between an engine crankshaft and drive wheels automatically to couple the engine and the transmission at least during vehicle travel and to uncouple them at least during vehicle stand-still, or a computer-controlled, hydraulically-actuated lock-up clutch capable of engaging automatically to lock the impeller and turbine wheels together to give a direct drive at a predetermined ratio of turbine-to-engine speed.

2. Description of the Prior Art

In recent years, there have been proposed and developed various control systems for controlling engaging and disengaging operations of a releasable coupling device such as a so-called start clutch for a continuously variable transmission (often abbreviated to a "CVT") or a lock-up clutch employed in an automotive automatic transmission with a so-called lock-up torque converter. For example, Japanese Patent Provisional Publication Nos. 5-141526 and 8-21526 disclose systems for controlling the engaging and disengaging of a lock-up clutch. In the Japanese Patent Provisional Publication No. 5-141526, a control system operates to temporarily release a lock-up clutch in presence of the output of a brake signal resulting from depression of a brake pedal and to re-engage the lock-up clutch, when, after a predetermined time period has been elapsed from the temporary release, a vehicle deceleration is still below a predetermined value or a vehicle speed is still above a predetermined speed. This re-engagement of the lock-up clutch, being executable during moderate deceleration of the vehicle or during driving at a medium or high speed greater than the predetermined speed, ensures a better engine braking effect (a better engine braking response) or a better exhaust braking effect (a better exhaust braking response). On the other hand, the Japanese Patent Provisional Publication No. 8-21526 teaches the setting of engagement capacity of lock-up to the minimum acceptable lock-up engagement capacity just below the point where the transmission torque converter would internally slip owing to back torque-flow directed from drive wheels towards the engine during coasting of the vehicle (during vehicle inertial travel owing to vehicle inertia without any driving torque (positive wheel torque) transmitted to drive wheels). Thus, when shifting from such coasting to quick vehicle deceleration (owing to so hard braking), the lock-up clutch can be abruptly released, thus reducing risk of stalling the engine. The system disclosed in the Japanese Patent Provisional Publication No. 8-21526 operates to keep lock-up at the previously-noted minimum acceptable lock-up engagement capacity if the magnitude of vehicle deceleration monitored is less than a predetermined threshold value during shifting from coasting to quick deceleration. A system for controlling an automatic clutch sometimes called a "start clutch", different from the previously-discussed lock-up clutch, has been disclosed in Japanese Patent Provisional Publication Nos. 7-229525 and 8-226501.

Of these prior art control systems discussed above, for instance when taking notice of a control system for a lock-up clutch, as disclosed in the Japanese Patent Provisional Publication No. 8-21526 assigned to the assignee of the present invention, an electronic control unit generally uses a throttle opening and a vehicle speed as control parameters for automatically controlling the lock-up clutch. The vehicle speed can be arithmetically calculated from revolution speeds of the output shaft of a transmission and be regarded as a value equivalent to a rotational speed of drive wheels. Usually, when the vehicle speed (equivalent to a drive-wheel speed) exceeds a predetermined value during coasting, the lock-up clutch is brought into engagement. Conversely, as soon as the vehicle speed becomes below the predetermined value, the lock-up clutch is released. In the conventional control system, a shifting action from one of application (engagement) and release (disengagement) of the lock-up clutch to another would be attained abruptly for a too brief moment. In other words, lock-up is automatically turned on or off for a too brief moment in response to a control command signal from the electronic control unit (ECU). Abrupt application or release of the lock-up clutch results in several drawbacks. For example, when the ECU abruptly releases the torque-converter lock-up feature, the driver may experience an uncomfortable acceleration feel. Such an uncomfortable acceleration feel caused by abrupt release of the lockup clutch, is remarkable on automotive vehicles equipped with an electronically-controlled engine having a fuel cutoff unit which is able to operate at a so-called coast fuel-cutoff mode to temporarily shut off fuel supply to fuel injectors during coasting of the vehicle in order to insure a better engine braking response and to improve fuel economy. That is, when the vehicle is decelerated rapidly during severe braking, the drive-wheel speed will soon become below the predetermined threshold value, and thus the lock-up clutch is released abruptly. At the same time, the fuel cutoff unit begins to operate at the fuel cutoff mode. As a consequence, transmission of back torque-flow from the drive wheels to the engine is shut off with the lock-up clutch disengaged and also the engine speed drops owing to deceleration fuel cutoff. This results in a rapid drop in the engine speed. To avoid engine stall tendencies due to rapid drop in the engine speed, the ECU switches from the fuel cutoff mode to a fuel-supply recovery mode (simply fuel-recovery mode), with the result that the vehicle begins to accelerate again with abruptly increased engine output power. This may amplify uncomfortable feeling of the driver during lock-up and fuel cutoff controls.

SUMMARY OF THE INVENTION

Accordingly, it is an object of the invention to provide a control system for controlling engaging and disengaging operations of a releasable coupling device placed in an automotive power train between an engine crankshaft and drive wheels, which avoids the aforementioned disadvantages of the prior art.

It is another object of the invention to provide a control system for controlling engaging and disengaging operations of a releasable coupling device placed in an automotive power train between an engine crankshaft and drive wheels, which can avoid uncomfortable driver's feeling, which may often occur owing to a fuel-recovery mode triggered by a quick drop in the engine speed, by moderately releasing the coupling device at a first predetermined vehicle speed (substantially equivalent to a first predetermined drive-wheel speed) as low as possible during normal deceleration with a relatively low deceleration rate.

It is a further object of the invention to provide a control system for controlling engaging and disengaging operations of a releasable coupling device placed in an automotive power train between an engine crankshaft and drive wheels, which can avoid engine stall by quickly releasing the coupling device at a second predetermined vehicle speed (substantially equivalent to a second predetermined drive-wheel speed) less than the previously-noted first predetermined vehicle speed during hard braking with a relatively high deceleration rate, particularly in an emergency or panic-stop situation, or during quick deceleration on low-$\mu$ roads.

In order to accomplish the aforementioned and other objects of the present invention, a releasable coupling control system in combination with an electronic engine control unit executable a fuel cutoff mode during vehicle deceleration and re-startable a fuel-supply recovery mode as soon as an engine speed drops below a predetermined threshold value, for controlling engaging and disengaging operations of a releasable coupling device placed in an automotive power train between an engine and drive wheels, comprises a wheel-speed sensor for detecting a drive-wheel speed to generate a drive-wheel speed indicative signal, and a controller being configured to be responsive to the drive-wheel speed indicative signal for moderately releasing the releasable coupling device at a moderate turn-off mode when the drive-wheel speed indicative signal value drops below a first predetermined value, and for quickly releasing the releasable coupling device at a quick turn-off mode when the drive-wheel speed indicative signal value drops below a second predetermined value.

It is preferable that the first predetermined value is set at a value satisfying a necessary condition in which the engine is prevented from stalling by moderately releasing the releasable coupling device from a time when the drive-wheel speed indicative signal value becomes below the first predetermined value while decelerating the drive wheels at a first preselected deceleration rate, and wherein the second predetermined value is set at a value satisfying a necessary condition in which the engine is prevented from stalling by quickly releasing the releasable coupling device from a time when the drive-wheel speed indicative signal value becomes below the second predetermined value while decelerating the drive wheels at a second preselected deceleration rate greater than the first preselected deceleration rate. More preferably, the first predetermined value may be set to a predetermined low vehicle speed greater than the predetermined second value and as close to a minimum value as possible in which the releasable coupling device is completely disengaged by moderately releasing the releasable coupling device from the time when the drive-wheel speed indicative signal value becomes below the first predetermined value while decelerating the drive wheels at the first preselected deceleration rate, before the second predetermined value is reached. More preferably, the second predetermined value may be set to a predetermined low vehicle speed as close to a minimum value as possible in which the releasable coupling device is completely disengaged without stalling the engine by quickly releasing the releasable coupling device from the time when the drive-wheel speed indicative signal value becomes below the second predetermined value while decelerating the drive wheels at the second preselected deceleration rate. It is preferable that the first predetermined value is determined as a vehicle speed satisfying a necessary condition in which a required time for decelerating the drive-wheel speed from the first predetermined value to the predetermined second value at the first preselected low deceleration rate is greater than a required time for moderately shifting the releasable coupling device from a full engagement state to a full disengagement state during the moderate turn-off mode initiated as soon as the drive-wheel speed drops just below the first predetermined value, and wherein the second predetermined value is determined as a vehicle speed satisfying a necessary condition in which a required time for decelerating the drive-wheel speed from the second predetermined value to a vehicle speed equivalent to an engine stall speed at the second preselected high deceleration rate is greater than a delay time necessary for shifting to the full disengagement state from initiation of the quick turn-off mode after the second predetermined value has been reached. More preferably, the second predetermined value may be set at a lower value as a temperature of working fluid used to hydraulically operate the releasable coupling device increases. The releasable coupling device may be a torque converter lock-up clutch or a start clutch for a continuously variable transmission.

DESCRIPTION OF THE PREFERRED EMBODIMENTS

Figure 1:
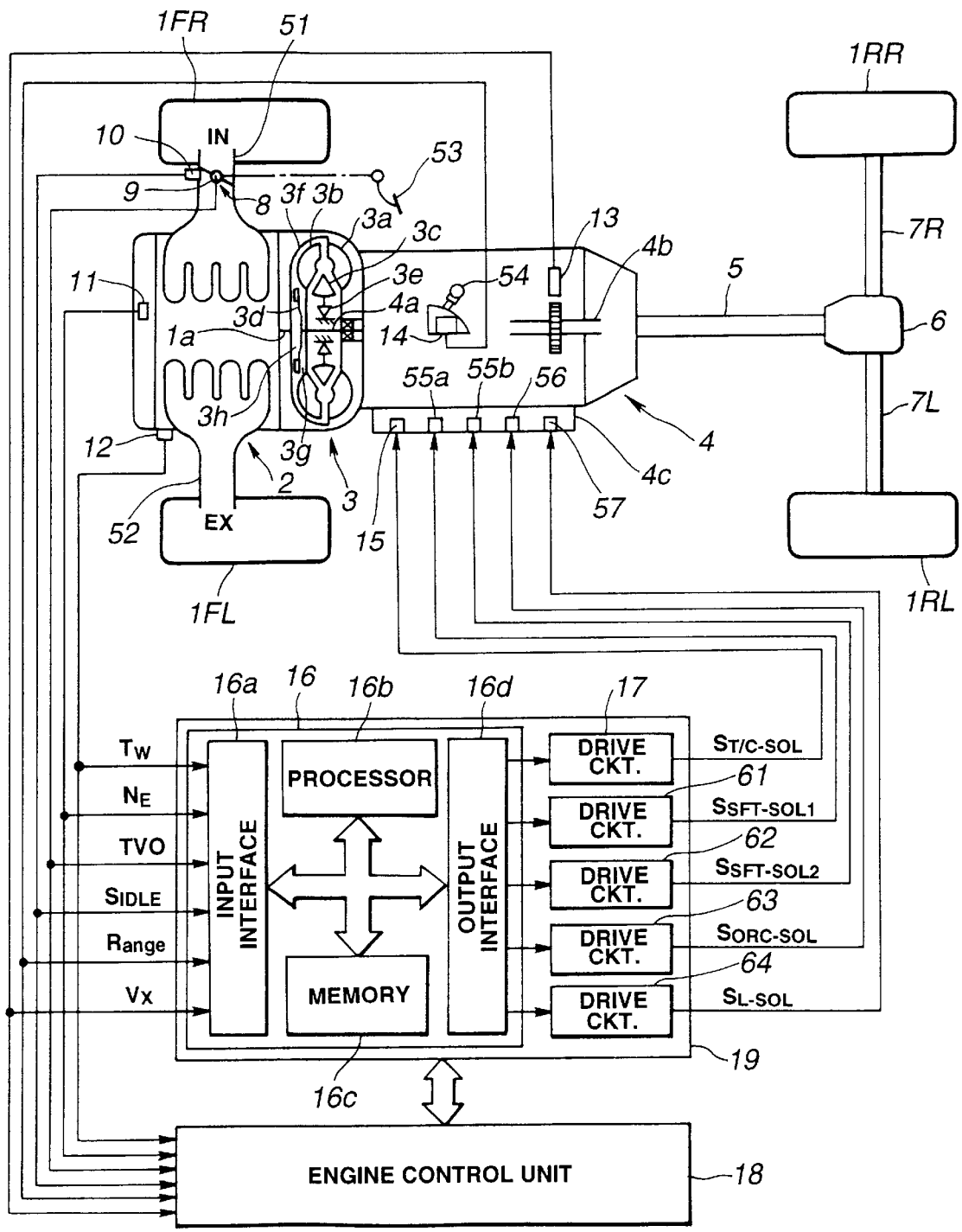
FIG. 1 is a system diagram illustrating one embodiment of a control system for controlling engaging and disengaging operations of a releasable coupling device (e.g., a torque-converter lockup clutch employed in an automatic transmission), made according to the invention.
Figure 2A:
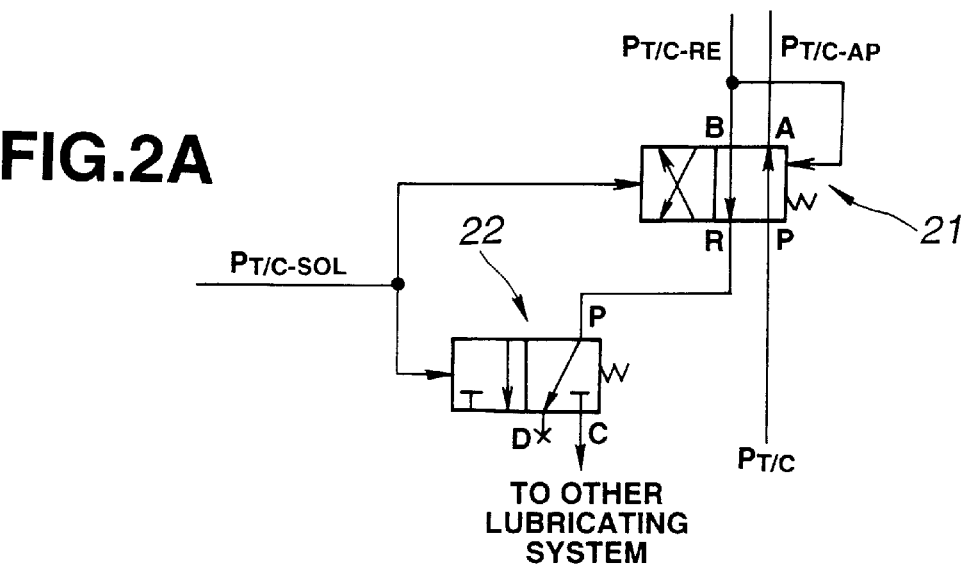
FIG. 2A is a hydraulic system diagram illustrating an essential part of the hydraulic system being applicable to a lockup clutch device of the automatic transmission shown in FIG. 1.
Figure 2B:
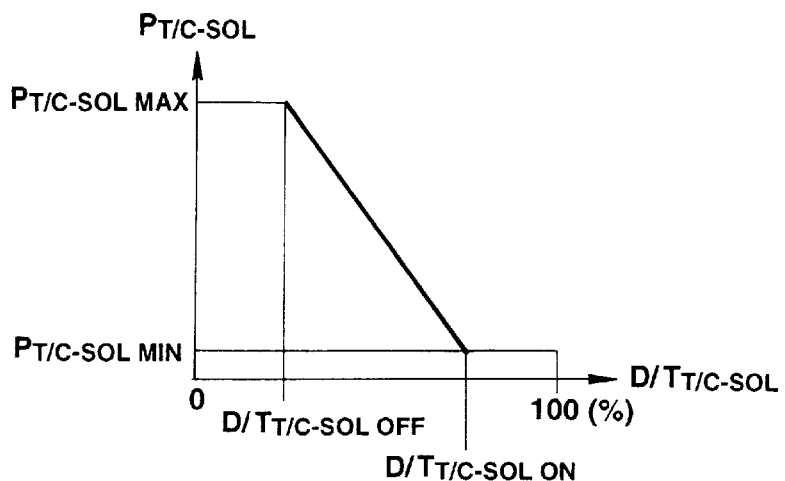
FIGS. 2B and 2C are graphs respectively showing the relationship between a lock-up control pressure ($P_{T/C\text{-}SOL}$) and a lock-up control duty ratio ($D/T_{T/C\text{-}SOL}$), and the relationship between an apply pressure ($P_{T/C\text{-}AP}$) and a release pressure ($P_{T/C\text{-}RE}$)

Referring now to the drawings, particularly to FIG. 1, the releasable-coupling-device control system of the invention is exemplified in case of a rear-wheel drive vehicle having front-left and front-right driven wheels 1FL and 1FR and rear-left and rear-right drive wheels 1RL and 1RR and having a so-called lock-up torque converter 3 coupling an internal combustion engine 2 with a power train including an automatic transmission 4. The lock-up torque converter 3 transmits engine-power output to a transmission input shaft (not numbered) via a working oil (precisely an internal working fluid). The magnitude of driving torque is adjusted within the automatic transmission 4, and then the adjusted driving torque is delivered through a propeller shaft 5 into a differential 6, and then divided into the rear-left and rear-right axle driveshafts 7L and 7R, and further transmitted to the two rear drive wheels 1RL and 1RR. As seen in FIG. 1, a throttle valve 8 is provided in an intake-air conduit 51 of the engine 2. The opening of the throttle valve 8 is changeable depending on the amount of depression of an accelerator pedal 53. A variety of engine/vehicle sensors are also attached to the engine 2 and installed as engine peripheral sensor parts. An electronic engine control unit (ECU) 18 uses signals from these engine/vehicle sensors to electronically control a combusting condition of the engine. Also, an automatic transmission control unit 19 uses signals from these sensors to electronically control the shift sequence of the automatic transmission 4 and the operating mode of a lock-up clutch employed in the torque converter 3. For example, the previously-noted engine/vehicle sensors are a throttle opening sensor 9, an idle switch 10, an engine speed sensor 11, a coolant temperature sensor 12 (often called a water temperature sensor), a vehicle speed sensor (or a wheel speed sensor, or a transmission output shaft speed sensor) 13, and an inhibitor switch 14. The throttle opening sensor 9 is attached to the intake-air conduit 51 to monitor a throttle opening TVO of the throttle valve 8. The idle switch 10 is provided to detect a fully-closed state of the throttle valve 8 and to generate a voltage output signal SIDLE (of a logical value "1") representative of the turned-ON state of the switch 10 when the throttle valve 8 is kept in its fully closed position. The engine speed sensor 11 is usually attached to the engine front cover to monitor an engine speed $N_E$. The coolant temperature sensor 12 is located on the engine and generally screwed into one of the top coolant passages to sense the actual operating temperature of the engine. The vehicle sensor 13 is located near the transmission output shaft 4b to detect the rotational speed of the transmission output shaft 4b. The rotational speed of the transmission output shaft 4b is used as a vehicle speed Vx (substantially equivalent to a mean drive-wheel speed Vw). The inhibitor switch 14 is provided to monitor an operating range Range selected by a control lever 54. The input interface of the engine control unit 18 and the input interface 16a of the transmission control unit (or a transmission controller) 19 both receive input information from the engine/vehicle sensors designed to monitor a specific condition on the engine or vehicle. The lock-up torque converter 3 accommodates therein a lock-up clutch having a lock-up facing 3d. The torque converter lockup clutch is operatively arranged between a torque-converter input element (e.g., a pump impeller 3a) and a torque-converter output element (e.g., a turbine runner 3b). The pump impeller 3a is connected to the engine output shaft 1a (engine crankshaft) via a torque-converter cover 3f and thus having a driven connection with the engine. On the other hand, the turbine runner 3b is connected to the input shaft 4a of the automatic transmission 4 and having a driving connection with a power train. Turbine-runner wheels 3b and impeller wheels 3a are arranged to be opposed to each other. Reference sign 3c denotes a stator disposed between the impeller 3a and the turbine 3b through a one-way clutch 3e which supports the stator 3c to permit torque-converter rotation (stator rotation) in one rotational direction. The torque converter lockup clutch includes an apply chamber 3g to which a torque-converter apply pressure $P_{T/C-AP}$ is applied and a release chamber 3h to which a torque-converter release pressure $P_{T/C-RE}$ is applied. More precisely, in FIG. 1, the right-hand face of the lock-up facing 3d and the left-hand face of the turbine runner 3b define the apply chamber 3g, while the left-hand face of the lock-up facing 3d and the inner peripheral wall surface of the converter cover 3f define the release chamber 3h. The working-fluid pressure delivered in the release chamber 3h is supplied to the downstream side of the torque converter through the apply chamber 3g. The automatic transmission 4 shown in FIG. 1 is a typical four-speed automatic transmission with a sun gear, two sets of planetary gears with carriers, and two ring gears. A hydraulic actuator 4c contains a variety of electromagnetic solenoid valves 15, 55a, 55b, 56 and 57. These electromagnetic solenoid valves are driven or controlled in response to respective drive signals (control signals) from the drive circuits 17, 61, 62, 63 and 64 of the transmission control unit 19. In more detail, the hydraulic actuator unit 4c includes two shift solenoid valves 55a and 55b, an overrunning-clutch solenoid valve 56, and a line-pressure solenoid valve 57, in addition to the previously-noted lock-up solenoid valve 15. Of these solenoid valves, the two solenoid valves 56 and 57 are conventional, and thus detailed explanation of these valves 56 and 57 is omitted. Hereinafter discussed in detail are the construction and operation of a lock-up solenoid valve 15, and the relationship between a torque-converter control pressure (or a lock-up control pressure) $P_{T/C-SOL}$ output from the lock-up solenoid valve 15 and a converter pressure $P_{T/C}$ regulated by the above-mentioned control pressure $P_{T/C-SOL}$. In the shown embodiment, the lock-up solenoid valve 15 consists of a standard duty-cycle controlled electromagnetic solenoid valve which is energized by a pulsewidth modulated (PWM) voltage signal (the drive signal $S_{T/C-SOL}$) at a controlled duty cycle $D/T_{T/C-SOL}$ for controlling the opening and closing of the valve 15. Actually, the drive signal $S_{T/C-SOL}$ of a controlled duty ratio $D/T_{T/C-SOL}$ is generated from the transmission control unit 19 to the lock-up solenoid valve 15, thus ensuring the control or regulation of the pressure differential ($P_{T/C-AP}$–$P_{T/C-RE}$) between the apply ($P_{T/C-AP}$) and release ($P_{T/C-RE}$) pressures. That is, the control pressure $P_{T/C-SOL}$ output from the solenoid valve 15 is controllable depending on a lock-up control duty ratio $D/T_{T/C-SOL}$ of the lock-up solenoid valve 15. In a conventional manner, the lock-up clutch is controllable in response to the pressure differential ($P_{T/C-AP}$–$P_{T/C-RE}$) between the apply and release pressures to operate either one of three operational zones, namely an open converter zone at which the lock-up clutch is released, a slip lock-up zone at which the lock-up clutch is partially engaged, and a full lock-up zone at which the lock-up clutch is fully engaged. The torque-converter control pressure ($P_{T/C\text{-}SOL}$) versus lock-up control duty ratio (D/$T_{T/C\text{-}SOL}$) characteristic is shown in FIG. 2B. As seen in FIG. 2B, the control pressure $P_{T/C\text{-}SOL}$ is kept at a predetermined maximum value $P_{T/C\text{-}SOLMAX}$ within a range below a predetermined solenoid turn-off duty ratio D/$T_{T/C\text{-}SOLOFF}$, whereas the control pressure $P_{T/C\text{-}SOL}$ is kept at a predetermined minimum value $P_{T/C\text{-}SOLMIN}$ within a range above a predetermined solenoid turn-on duty ratio D/$T_{T/C\text{-}SOLON}$. The lock-up solenoid valve 15 is designed so that the control pressure $P_{T/C\text{-}SOL}$ reduces in a linear fashion as the lock-up control duty ratio D/$T_{T/C\text{-}SOL}$ increases. As seen in FIG. 2A, the previously-noted control pressure $P_{T/C\text{-}SOL}$ serves as an external pilot pressure for both a converter-pressure switching valve 21 and a release pressure switching valve 22. As may be appreciated from the hydraulic circuit shown in FIG. 2A, the converter-pressure switching valve 21 consists of a typical external-pilot operated, four-port two-position directional control valve. The converter-pressure line of the converter pressure $P_{T/C}$ necessary for lock-up control is selectively connected to either one of the apply chamber 3g and the release chamber 3h by way of the switching valve 21. In the switching valve 21, the fluid pressure in the outlet port B, that is, a feed-back pressure of the release pressure $P_{T/C\text{-}RE}$ acts as an external pilot pressure on one pressure-receiving face of the valve spool contained within the switching valve 21 in the same direction as the action of biasing force of a return spring (not numbered) disposed in the valve 21. The above-mentioned control pressure $P_{T/C\text{-}SOL}$ acts as another external pilot pressure on the other pressure-receiving face of the valve spool contained within the switching valve 21. Thus, the two external pressures $P_{T/C\text{-}RE}$ and $P_{T/C\text{-}SOL}$ and the spring bias of the return spring of the switching valve 21 allow the valve 21 to move under the combined action of the two external pilot pressures and the spring bias. On the other hand, the release-pressure switching valve 22 consists of a typical external-pilot operated, three-port two-position directional control valve. In the release-pressure switching valve 22, its inlet port P is connected to a return port R of the converter-pressure switching valve 22, while its outlet port C is connected to the other lubricating system whose required pressure is set at a predetermined minimum apply-pressure value $P_{T/C\text{-}APMIN}$ as described later. The port D of the switching valve 22 denotes a drain port. Thus, the external pilot pressure $P_{T/C\text{-}SOL}$ and the spring bias of the return spring of the switching valve 22 allow the valve 22 to move under the combined action of the external pilot pressure $P_{T/C\text{-}SOL}$ and the spring bias. With the previously-noted valve arrangement, there is the relationship between the torque-converter apply pressure $P_{T/C\text{-}AP}$ applied to the apply chamber 3g and the torque-converter release pressure $P_{T/C\text{-}RE}$ applied to the release chamber 3h (see FIG. 2C). As can be appreciated from the apply pressure ($P_{T/C\text{-}AP}$) versus release pressure ($P_{T/C\text{-}RE}$) characteristics shown in FIG. 2C, when the control pressure $P_{T/C\text{-}SOL}$ is the predetermined minimum value $P_{T/C\text{-}SOLMIN}$, the release pressure $P_{T/C\text{-}RE}$ is set at 0 MPa. The release pressure $P_{T/C\text{-}RE}$ increases linearly with a gradual increase in the control pressure $P_{T/C\text{-}SOL}$ from 0 MPa. When the predetermined maximum pressure value $P_{T/C\text{-}SOLMAX}$ is reached, the release pressure $P_{T/C\text{-}RE}$ becomes equal to the maximum pressure level equal to the converter pressure $P_{T/C}$. On the contrary, when the control pressure $P_{T/C\text{-}SOL}$ is the predetermined minimum pressure value $P_{T/C\text{-}SOLMIN}$, the apply pressure $P_{T/C\text{-}AP}$ is regulated to the maximum pressure level equal to the converter pressure $P_{T/C}$. The apply pressure $P_{T/C\text{-}AP}$ decreases linearly as the control pressure $P_{T/C\text{-}SOL}$ gradually increases from 0 MPa. As soon as the predetermined maximum pressure value $P_{T/C\text{-}SOLMAX}$ is reached, the apply pressure $P_{T/C\text{-}AP}$ becomes equal to a constant pressure value (a predetermined minimum apply-pressure value $P_{T/C\text{-}APMIN}$) required for the other lubricating system. For example, when the duty ratio D/$T_{T/C\text{-}SOL}$ is 0%, the control pressure $P_{T/C\text{-}SOL}$ is set at the maximum value $P_{T/C\text{-}SOLMAX}$, thus permitting the torque converter lockup clutch to be fully disengaged (released). Conversely, when the duty ratio D/$T_{T/C\text{-}SOL}$ is 100%, the control pressure $P_{T/C\text{-}SOL}$ is set at the minimum value $P_{T/C\text{-}SOLMIN}$, thus permitting the torque converter lockup clutch to be fully engaged (applied).

Referring to the engine control unit (ECU) 18, the central processing unit (CPU) contained within the ECU is responsive to signals from the various engine/vehicle sensors for carrying out the engine programs stored in the memory (ROM, RAM) and is capable of performing necessary arithmetic and logic operations for system actuation. For example, the input interface of the ECU receives the throttle opening indicative signal TVO from the throttle opening sensor 9, and then the processor of the ECU determines that the vehicle is coasting under a specific condition wherein at least the signal value TVO corresponds to an opening 0/8. The ECU 18 operates to stop fuel injection during such vehicle coasting. Conversely, the ECU 18 operates to forcibly recover fuel-injection action of the fuel injector, when the transmission control unit 19 generates a command signal indicative of fuel-supply recovery (simply fuel-recovery) to the ECU 18, or when the engine speed NE sensed by the engine speed sensor 11 becomes less than a fuel-recovery engine speed $N_{FCR}$. As shown in the lower half of FIG. 1, usually the transmission control unit 19 comprises a microcomputer 16 and five drive circuits 17, 61, 62, 63 and 64. Of these, the microcomputer 16 is generally constructed by an input interface circuit 16a including an analog-to-digital (A/D) converter for converting an analog input information or data such as each sensor signal (TVO, $S_{IDLE}$, $N_E$, Tw, Vx, Range) from the plural engine/vehicle sensors 9, 10, 11, 12, 13 and 14, to a digital signal, an arithmetic processing unit 16b containing a micro processor unit (MPU), memories (ROM, RAM) 16c for storing a program (see the flow chart shown in FIG. 3) necessary to control engagement (application) or disengagement (release) of the lock-up clutch of the lock-up torque converter 3, and for permanently storing a preprogrammed information (see data maps shown in FIGS. 4 and 5) and for temporarily storing the results of ongoing arithmetic calculations, and an output interface circuit 16d generally including a digital-to-analog (D/A) converter. The output interface circuit 16d is connected to individual special drivers (drive circuits) 17, 61, 62, 63 and 64 to handle or drive the respective solenoid valves is, 55a, 55b, 56 and 57. Concretely, the arithmetic processing unit 16b is responsive to the signals from the engine/vehicle sensors and signal data from the engine control unit 18, for determining a required line pressure, a desired reduction gear ratio, or as to whether a first speed gear is selected, or as to whether lock-up action is required. Control signals based on the results of ongoing arithmetic calculations are generated from the processor 16b via the output interface 16d to the respective drive circuits 17, 61, 62, 63 and 64. The drive circuit denoted by reference sign 17 is a lock-up solenoid drive circuit. The drive circuit 61 is a first shift-solenoid drive circuit, whereas the drive circuit 62 is a second shift-solenoid drive circuit. The drive circuit 63 is an overrunning clutch solenoid drive circuit, whereas the drive circuit 64 is a line-pressure solenoid drive circuit.

Figure 3:
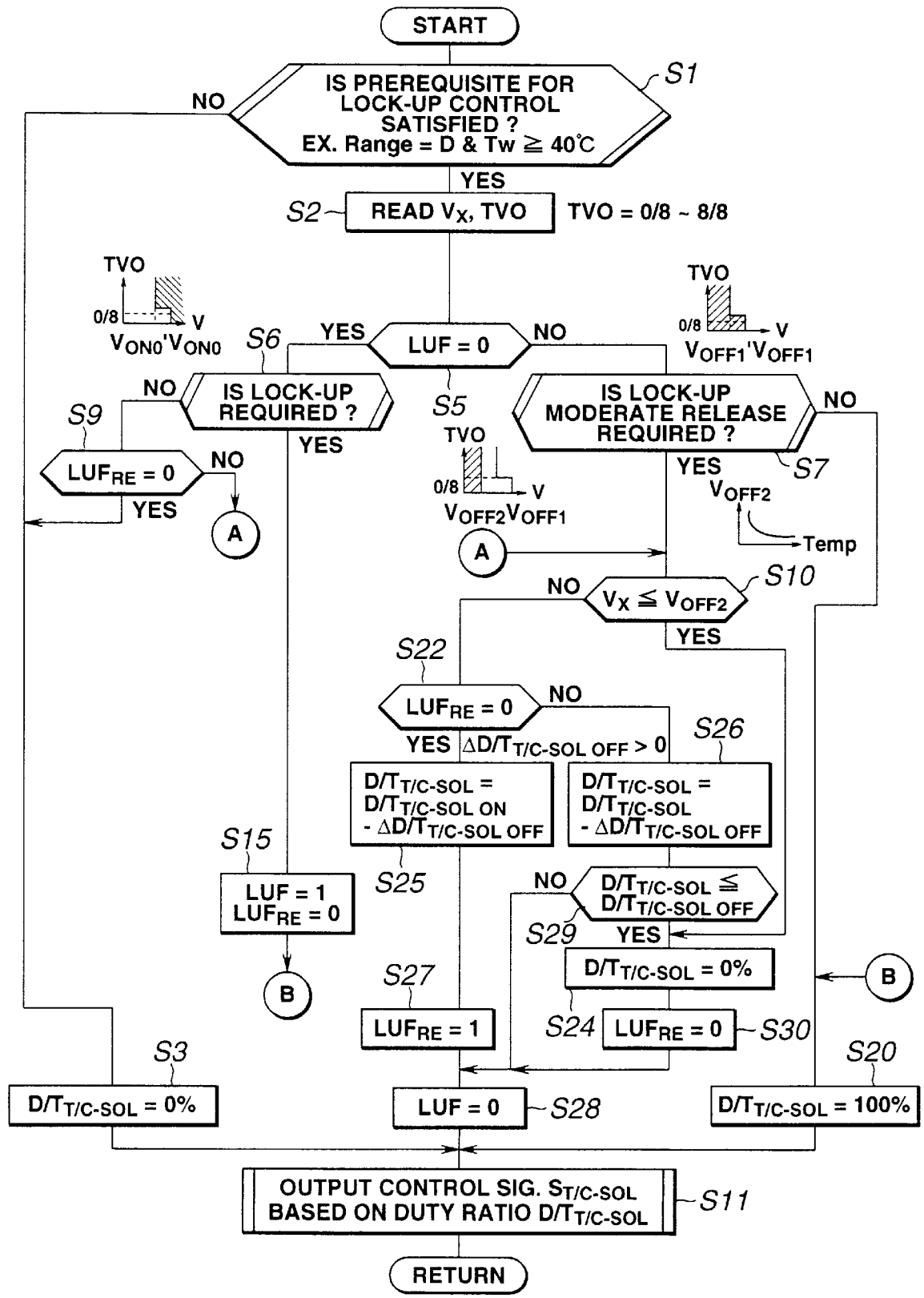
FIG. 3 is a flow chart illustrating one example of arithmetic processing executed by a transmission control unit employed in the system of the embodiment shown in FIG. 1.

Referring now to FIG. 3, there is shown a program for lock-up control {or pressure-differential ($P_{T/C-AP}$–$P_{T/C-RE}$) transient control} of the lock-up torque converter 3. The lock-up control is performed by the microcomputer 16 of the transmission control unit 19 and executed by the processor 16b as time-triggered interrupt routines to be triggered every predetermined sampling time intervals $\Delta T$ such as 10 msec. In a conventional manner, the processor 16b communicates through a data link (signal lines commonly known either as data buses or address buses) with the memories 16c to transmit or transfer informational signal data from one of the two sections 16b and 16c to the other. The arithmetic processing for lock-up control is herebelow described in detail in accordance with the flow chart of FIG. 3.

Figure 4:
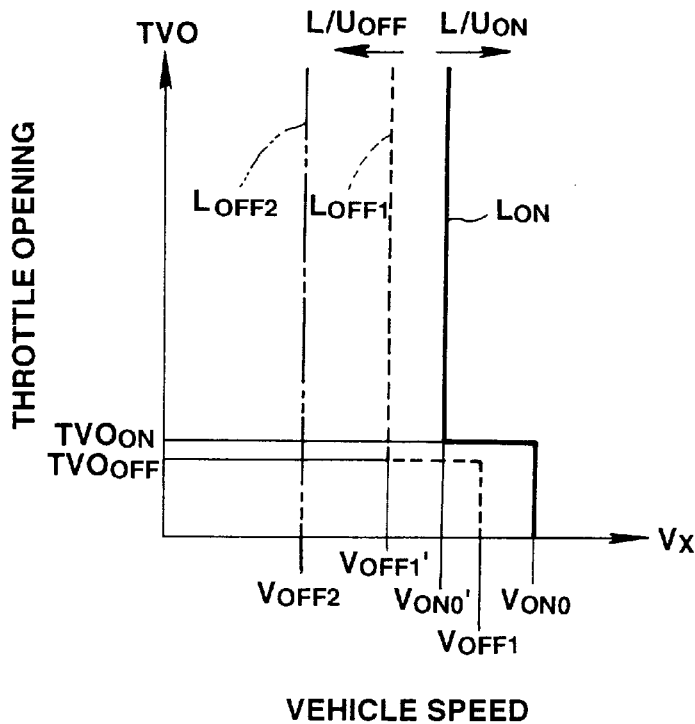
FIG. 4 is a map necessary for engagement ($L_{ON}$ and disengagement ($L_{OFF1}$, $L_{OFF2}$) of lock-up in the arithmetic processing shown in FIG. 3.

In step S1, by virtue of another sub-routine, a test is made to determine whether a prerequisite for lock-up control is satisfied. The engine coolant temperature indicative signal Tw from the engine coolant temperature sensor 12 and the operating-range indicative signal Range from the inhibitor switch 14 are often used for determining whether the prerequisite is satisfied or unsatisfied. For example, if the selected operating-range indicative signal Range indicates a D range and the coolant temperature indicative signal value Tw is above 40° C., the processor 16b determines that the prerequisite for lock-up control is satisfied. The prerequisite means that there is a satisfactory responsiveness for lock-up control and unlock-up control (lock-up moderate or quick release control). When the answer to step S1 is affirmative (YES), step S2 occurs. When the answer to step S1 is negative (NO), step S3 occurs. In step S2, the vehicle speed Vx (essentially equivalent to a mean drive-wheel speed Vw) and the throttle opening TVO are read, and then step S5 proceeds. In step S5, a test is made to determine whether a lock-up flag LUF is reset or set. When the lock-up flag LUF is reset to "0", the procedure flows to step S6. When the lock-up flag LUF is set at "1", the procedure flows to step S7. In step S6, by virtue of another sub-routine, the processor 16b determines as to whether the lock-up action is required or not. When the processor 16b decides that lock-up is required, step S15 occurs. When the processor 16b decides that lock-up is not required, step S9 occurs. As previously discussed, the two sensor signals TVO and Vx are generally used as input data reflecting the engine/vehicle operating conditions. In step S6, the necessity of lock-up is determined depending on the two operating parameters, namely the vehicle speed Vx (approximately equivalent to the mean drive-wheel speed) and the opening TVO of the throttle valve 8. Actually, as appreciated from the lock-up turn-on and turn-off characteristics shown in FIG. 4, the turn-on (engagement) or turn-off (disengagement) of the lock-up clutch are determined depending on whether the matrix [TVO, Vx] of the throttle opening TVO and the vehicle speed Vx is located at or included in a right-hand side zone of a predetermined lock-up turn-on characteristic curve $L_{ON}$ indicated by the solid line. When the matrix [TVO, Vx] is included in the right-hand side zone of the predetermined lock-up turn-on characteristic curve $L_{ON}$, the processor 16b determines that lock-up is necessary. As may be appreciated from the predetermined lock-up turn-on characteristic curve $L_{ON}$ indicated by the solid line, when the throttle opening TVO is less than a first predetermined low opening $TVO_{ON}$, the vehicle speed Vx is fixed to a predetermined coast lock-up turn-on vehicle speed $V_{ON0}$. When the throttle opening TVO is above the first predetermined low opening $TVO_{ON}$, the vehicle speed Vx is fixed to a predetermined usual lock-up turn-on vehicle speed $V_{ON0'}$. Referring to step S9, a test is made to determine whether a lock-up release flag $LUF_{RE}$ is reset to "0". When the lock-up release flag $LUF_{RE}$ is reset, the procedure flows to step S3. When the lock-up release flag $LUF_{RE}$ is set, the procedure flows to step S10. In step S3, the lock-up control duty ratio $D/T_{T/C-SOL}$ is set at 0%, and then the control signal output ($S_{T/C-SOL}$) routine is entered at step S11. In step S15, the lock-up flag LUF is set at "1" and at the same time the lock-up release flag $LUF_{RE}$ is reset to "0", and then the procedure flows to step S20. On the other hand, in step S7, by virtue of another sub-routine, the processor 16b determines as to whether the lock-up moderate release is required or not. When the answer to step S7 is affirmative (YES), step S10 occurs. When the answer to step S7 is negative (NO), step S20 occurs. The necessity of the lock-up moderate release action is determined depending on the previously-explained matrix [TVO, Vx]. As appreciated from a predetermined lock-up moderate release (turn-off) characteristic curve $L_{OFF1}$ indicated by the broken line in FIG. 4, when the matrix [TVO, Vx] is included in the left-hand side zone of the predetermined lock-up moderate release characteristic curve $L_{OFF1}$, the micro processor 16b determines that the lock-up moderate release action is necessary. As may be appreciated from the predetermined lock-up moderate turn-off characteristic curve $L_{OFF1}$ (indicated by the broken line) of FIG. 4, when the throttle opening TVO is less than a second predetermined low throttle opening $TVO_{OFF}$ below the previously-noted first predetermined low throttle opening $TVO_{ON}$ and as close-to a minimum value substantially corresponding to a substantially fully-closed position of the throttle valve 8 as possible, the vehicle speed Vx is fixed to a predetermined coast lock-up turn-off vehicle speed $V_{OFF1}$ less than the predetermined coast lock-up turn-on vehicle speed $V_{ON0}$ and greater than the predetermined usual lock-up turn-on vehicle speed $V_{ON0'}$. When the monitored throttle opening TVO is above the second predetermined low throttle opening $TVO_{OFF}$, the vehicle speed Vx is fixed to a predetermined usual lock-up turn-off vehicle speed $V_{OFF1'}$ less than the predetermined usual lock-up turn-on vehicle speed $V_{ON0'}$ and greater than a predetermined lock-up quick release (turn-off) vehicle speed $V_{OFF2}$ as will be fully discussed later. As seen in FIG. 4, the predetermined lock-up turn-on characteristic curve $L_{ON}$ is spaced slightly apart from the predetermined lock-up moderate turn-off characteristic curve $L_{OFF1}$. In other words, a hysteresis (response difference) is provided between the predetermined lock-up turn-on characteristic curve $L_{ON}$ and the predetermined lock-up moderate turn-off characteristic curve $L_{OFF1}$. As can be appreciated, the provision of such hysteresis prevents undesired control hunting between engagement and disengagement of the lock-up clutch. Returning to FIG. S20, the lock-up control duty ratio $D/T_{T/C-SOL}$ is set at 100%, and then step S11 enters.

Figure 5:
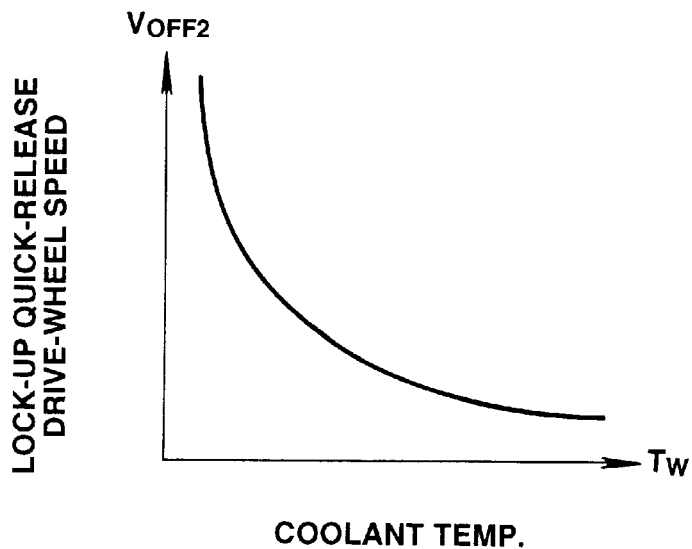
FIG. 5 is a map necessary for determination of a lock-up quick release drive-wheel speed ($V_{OFF2}$) depending upon an engine coolant temperature (Tw).

On the other hand, in step S10, a test is made to determine whether the vehicle speed Vx (substantially equivalent to the mean drive-wheel speed) is below the predetermined lock-up quick release (turn-off) vehicle speed $V_{OFF2}$. When the answer to step S10 is in the affirmative (YES), that is, $Vx \leq V_{OFF2}$, step S24 occurs. In case of $Vx > V_{OFF2}$, step S22 occurs. When the point defined by the matrix [TVO, Vx] is included in the left-hand side zone of a lock-up quick release (turn-off) characteristic curve $L_{OFF2}$ indicated by the two-dotted line of FIG. 4, the processor 16b determines that lock-up quick release action is required. As appreciated from the lock-up quick release characteristic straight-line $L_{OFF2}$ indicated by the two-dotted line, irrespective of the throttle opening TVO, the vehicle speed Vx is fixed to the predetermined lock-up quick release (turn-off) vehicle speed $V_{OFF2}$ less than the predetermined usual lock-up turn-off vehicle speed $V_{OFF1}$. As shown in FIG. 5, the predetermined lock-up quick release vehicle speed $V_{OFF2}$ is designed to increase, as the coolant temperature Tw regarded as a temperature of working oil (internal working fluid) decreases, because the engine stall speed $N_{ELIM}$ is affected by a viscosity of working oil.

In step S22, a test is made to determine whether the lock-up flag $LUF_{RE}$ is reset. When the lock-up release flag $LUF_{RE}$ is reset, step S25 enters. When the lock-up release flag $LUF_{RE}$ is set, step S26 enters. In step S25, a more recent lock-up control duty ratio $D/T_{T/C-SOL}$ is calculated by subtracting a predetermined low solenoid-turn-off duty ratio $\Delta D/T_{T/C-SOLOFF}$ from the predetermined solenoid turn-on duty ratio $D/T_{T/C-SOLON}$, and then step S27 occurs. The previously-noted low solenoid-turn-off duty ratio $\Delta D/T_{T/C-SOLOFF}$ is a positive value. In step S27, the lock-up release flag $LUF_{RE}$ is set at "1", and then step S28 occurs. On the other hand, in step S26, a more recent lock-up control duty ratio $D/T_{T/C-SOL}$ is derived by subtracting the predetermined low solenoid-turn-off duty ratio $\Delta D/T_{T/C-SOLOFF}$ from the lock-up control duty ratio $D/T_{T/C-SOL}$, and then step S29 occurs. In step S29, the lock-up control duty ratio $D/T_{T/C-SOL}$ calculated in step S26 is compared with the predetermined solenoid turn-off duty ratio $D/T_{T/C-SOLOFF}$. When the lock-up control duty ratio $D/T_{T/C-SOL}$ is below the predetermined solenoid turn-off duty ratio $D/T_{T/C-SOLOFF}$, step S24 occurs. Conversely, in case of $D/T_{T/C-SOL} > D/T_{T/C-SOLOFF}$, step S28 occurs. In step S24, the lock-up control duty ratio $D/T_{T/C-SOL}$ is set at 0%, and the program then proceeds to step S30. In step S30, the lock-up release flag $LUF_{RE}$ is reset, and the program then proceeds to step S28. In step S28, the lock-up flag LUF is reset and then the procedure flows to step S11. The control signal output routine S11 determines a solenoid drive signal value $S_{T/C-SOL}$ on the basis of the determined lock-up control duty ratio $D/T_{T/C-SOL}$, and outputs the drive signal $S_{T/C-SOL}$ based on the determined duty ratio $D/T_{T/C-SOL}$ to the lock-up solenoid valve 15. Thereafter, the procedure is returned to the main program. The operation of the micro processor 16b executable the arithmetic processing shown in FIG. 3 is hereunder described in detail.

Figure 2C:
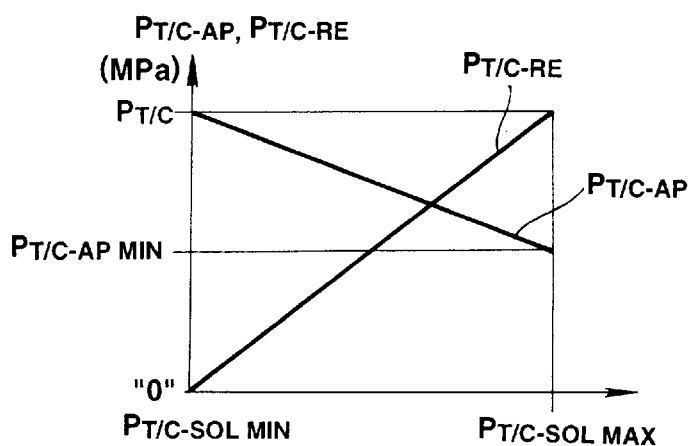

The arithmetic processing discussed hereunder is executed by the processor 16b on the assumption that the vehicle is started from the stand-still condition. Thus, when the arithmetic processing begins, flags LUF, $LUF_{RE}$ are all reset to zero and all of the results of arithmetic calculations are initialized. At the beginning of arithmetic processing, in step S1, a check is made to determine whether the prerequisite for lock-up control and unlock-up control is satisfied or unsatisfied. For example, when the driver selects the "D" range and thus the selected operating-range indicative signal Range indicates the "D" range (that is, the driver wishes automatic transmission control), and additionally the coolant temperature Tw (essentially equivalent to a temperature of internal working fluid used to hydraulically operate the lock-up clutch and used as a torque-converter working oil) is sufficiently high (e.g., above 40° C.), the processor 16b determines that the prerequisite for lock-up control is satisfied. Thus, the program proceeds to step S2. If these necessary conditions (Tw≧40° C., D range) are unsatisfied, the program proceeds to step S3 and thus the lock-up control duty ratio $D/T_{T/C-SOL}$ is set at 0%. When the prerequisite is not satisfied, the lock-up solenoid drive signal $S_{T/C-SOL}$ based on the determined duty ratio $D/T_{T/C-SOL}$ of "0%" is output to the lock-up solenoid valve 15 through step S11. As seen in FIGS. 2B and 2C, with the output of the solenoid drive signal $S_{T/C-SOL}$ based on the duty ratio $D/T_{T/C-SOL}$ of "0%", the lock-up control pressure $P_{T/C-SOL}$ is set at the maximum value $P_{T/C-SOLMAX}$, and thus the release pressure $P_{T/C-RE}$ becomes high and equal to the converter pressure $P_{T/C}$, while the apply pressure $P_{T/C-AP}$ becomes low and equal to the predetermined minimum apply-pressure value $P_{T/C-APMIN}$. Therefore, the lock-up facing 3d is kept adequately apart from the converter cover 3f to ensure a released condition of the lock-up clutch. Under such a lock-up release condition (or a disengaged state), that is, when the lock-up clutch assumes its open converter state, the engine crankshaft and the transmission output shaft 4b are coupled via an internal working fluid in the torque converter 3 in normal operation, and thus the torque converter permits a sufficient torque-increase action. Under these conditions, when the driver selects either the "1" range or the "2" range, adequate performance of acceleration may be obtained during starting period of the vehicle.

On the contrary, when the necessary conditions of step S1 are all satisfied, the procedure flows to step S2 at which the vehicle speed Vx and the throttle opening TVO are read. Since the lock-up flag LUF is still reset to "0", the procedure flows from step S5 to step S6. In step S6, a check is made to determine whether the matrix [TVO, Vx] of the vehicle speed and throttle opening data read at step S2, is included in the right-hand side zone of the predetermined lock-up turn-on characteristic curve $L_{ON}$ (see FIG. 4). When this matrix [TVO, Vx] is not included in the right-hand side zone of the predetermined lock-up turn-on characteristic curve $L_{ON}$, the program proceeds to step S9. At this time, since the lock-up release flag $LUF_{RE}$ is still reset, the program proceeds from step S9 via step S3 to step S11. As a result, the lock-up clutch is maintained at its release (turn-off) position. If the matrix [TVO, Vx] is included in the left-hand side zone of the predetermined lock-up turn-on characteristic curve $L_{ON}$, this means that the throttle opening TVO is a low opening close to a throttle opening of vehicle-coasting condition and/or the vehicle speed Vx is a low speed and thus a sufficient vehicle acceleration is still required. Therefore, it is necessary to properly set the left-hand side zone of the predetermined lock-up turn-on characteristic curve $L_{ON}$, so as to assure sufficient torque-increase action of the torque converter within this zone. When the vehicle speed Vx is shifted from a low speed range to a medium or high speed range, and/or the throttle opening TVO is shifted from a low throttle opening to a high throttle opening, the matrix [TVO, Vx] becomes shifted towards within the right-hand side zone of the predetermined lock-up turn-on characteristic curve $L_{ON}$ of FIG. 4. Under these conditions, the procedure flows from step S6 to step S15, and thus the lock-up flag LUF is set while the lock-up release flag $LUF_{RE}$ remains reset. The program then proceeds to step S20. In step S20, the lock-up control duty ratio $D/T_{T/C-SOL}$ is set at 100%, and thus the drive signal $S_{T/C-SOL}$ based on the duty ratio $D/T_{T/C-SOL}$ of 100% is output to the lock-up solenoid valve 15, with the result that the lock-up clutch assumes its full lock-up state (corresponding to a full lock-up position) In which the engine crankshaft and the transmission output shaft are directly and completely coupled to each other by a mechanical connection. This full lock-up state of the lock-up clutch is continued until the matrix [TVO, Vx] passes through the hysteresis zone defined between the two characteristic curves $L_{ON}$ and $L_{OFF1}$ and then shifted to the left-hand side zone of the characteristic curve $L_{OFF1}$. This properly timed full lock-up state avoids undesired internal slippage of the torque converter 3, and improves an efficiency of torque transmission, thus improving fuel economy. Under the previously-noted condition, when the brakes are applied with low-level depression of the brake pedal, the vehicle is decelerated moderately. During such low-level braking, the driver's foot is shifted from the accelerator pedal to the brake pedal and thus the throttle opening TVO reduces to a minimum value substantially corresponding to a substantially fully-closed throttle position (equal to a throttle opening of the vehicle coasting state). During the low-level braking, the drive-wheel speed is gradually moderately reduced, and as a result the vehicle speed indicative signal value Vx also reduces gradually. As soon as the vehicle speed data Vx becomes less than the predetermined coast lock-up turn-off vehicle speed $V_{OFF1}$, the program flows from step S7 to step S10. Just after the condition for lock-up moderate release (turn-off) is satisfied, the vehicle speed data Vx is just below the predetermined coast lock-up turn-off vehicle speed $V_{OFF1}$, but not less than the predetermined usual lock-up turn-off vehicle speed $V_{OFF2}$. Thus, the program proceeds to step S22. At this time, since the lock-up release flag $LUF_{RE}$ is not yet set, step S25 occurs. In step S25, a new lock-up control duty ratio $D/T_{T/C-SOL}$ is derived by subtracting the predetermined low duty ratio $\Delta D/T_{T/C-SOLOFF}$ from the predetermined solenoid turn-on duty ratio $D/T_{T/C-SOLON}$. Therefore, when the routine is repeatedly executed, the lock-up control duty ratio $D/T_{T/C-SOL}$ is decremented by the predetermined low duty ratio $\Delta D/T_{T/C-SOLOFF}$. After this, the lock-up release flag $LUF_{RE}$ is set at step S27, and then the lock-up flag LUF is reset at step S28. The program then proceeds to step S11 in which the drive signal $S_{T/C-SOL}$ based on the calculated duty ratio $D/T_{T/C-SOL}$ is output to the lock-up solenoid valve 15. Owing to the output of drive signal $S_{T/C-SOL}$ of the lock-up control duty factor $D/T_{T/C-SOL}$ slightly decremented from the predetermined solenoid turn-on duty ratio $D/T_{T/C-SOLON}$, the lock-up control pressure $P_{T/C-SOL}$ becomes increased slightly from the predetermined minimum value $P_{T/C-SOLMIN}$. As can be appreciated, the apply pressure $P_{T/C-AP}$ is reduced slightly, whereas the release pressure $P_{T/C-RE}$ is built up slightly. As a consequence, there is a slight decrease in the engaging force (or the lock-up engagement capacity) between the lock-up facing 3d and the inner wall surface of the converter cover 3f. That is, the lock-up clutch begins to shift from the full lock-up state toward the slip lock-up state. Thereafter, when the next routine is time-triggered, the program flows from step S5 to step S6, since the lock-up flag LUF has already been reset through step S28 in the previous routine. At this stage, assuming that the vehicle is further decelerated and also the throttle opening TVO remains low, the matrix [TVO, Vx] is not yet included in the right-hand side zone of the predetermined lock-up turn-on characteristic curve $L_{ON}$. Under these conditions, the processor 16b determines that the lock-up operation is not required, and thus the program flows via step S9 to step S10, since the lock-up release flag $LUF_{RE}$ has already been set through step S27 of the previous routine. If step S10 determines that the vehicle speed Vx is not less than the predetermined lock-up quick release (turn-off) vehicle speed $V_{OFF2}$, the program then proceeds to step S22, and then to step S26, because the lock-up release flag $LUF_{RE}$ is set. In step S26, a more recent lock-up control duty ratio $D/T_{T/Cl-SOL}$ is calculated by subtracting the predetermined low duty ratio $\Delta D/T_{T/C-SOLOFF}$ from the previous lock-up control duty ratio $D/T_{T/C-SOL}$ calculated at step S25 of the previous routine and stored in the corresponding memory address of the RAM. Thereafter, the flow from step S26 via step S28 to step S11 is repeated, until the calculated lock-up control duty ratio $D/T_{T/C-SOL}$ becomes below the predetermined solenoid turn-off duty ratio $D/T_{T/C-SOLOFF}$ or the answer to step S6 shifts from negative to affirmative. During repetition of the previously-noted flow through step S26, the lock-up control duty ratio $D/T_{T/C-SOL}$ is gradually decremented by the predetermined low duty ratio $\Delta D/T_{T/C-SOLOFF}$ every predetermined sampling time intervals $\Delta T$ such as 10 msec. As a result, the apply pressure $P_{T/C-AP}$ is continually decreased for a while, whereas the release pressure $P_{T/C-RE}$ is continually increased for a while, so as to permit a smooth transit from the full lock-up zone (corresponding to the fully engaged position of the lock-up clutch) via the slip lock-up zone (corresponding to the partially engaged position) to the open converter zone (corresponding to the lock-up clutch release position). Thereafter, assuming that on the one hand the vehicle speed Vx remains greater than the predetermined lock-up quick release vehicle speed $V_{OFF2}$, and on the other hand the calculated lock-up control duty ratio $D/T_{T/C-SOL}$ becomes below the predetermined solenoid turn-off duty ratio $D/T_{T/C-SOLOFF}$, the program proceeds to step S29, and then to step S24. In this manner, when the lock-up control duty ratio $D/T_{T/C-SOL}$ becomes below the predetermined solenoid turn-off duty ratio $D/T_{T/Cl-SOLOFF}$, the control pressure $P_{T/C-SOL}$ becomes the predetermined maximum pressure level $P_{T/C-SOLMAX}$, since the control pressure is kept at the predetermined maximum pressure level $P_{T/C-SOLMAX}$ within a duty-ratio range of 0% and the predetermined solenoid turn-off duty ratio $D/T_{T/C-SOLOFF}$ (see FIGS. 2B and 2C). Therefore, the apply pressure $P_{T/C-AP}$ becomes the predetermined minimum apply-pressure value $P_{T/C-APMIN}$, while the release pressure $P_{T/C-RE}$ becomes the maximum pressure level equal to the converter pressure $P_{T/C}$. Thus, the lock-up clutch assumes its open converter state (the fully-disengaged state of the lock-up clutch), in response to the pressure differential ($P_{T/C-APMIN}-P_{T/C}$). In the converter state, the lock-up facing 3d is out of contact with the converter cover 3f and thus there is less friction loss between the lock-up facing 3d and the inner wall of the converter cover 3f. In this manner, at the end of the lock-up moderate release mode, the lock-up clutch is shifted certainly from the slip lock-up state to the lock-up completely release state by setting the controlled duty ratio $D/T_{T/Cl-SOL}$ at 0% at step S24. Then, the program flows via S30 to step S28, so that the lock-up release flag $LUF_{RE}$ is reset again to "0", and at the same time the lock-up flag LUF is also reset. Thereafter, the controlled duty ratio $D/T_{T/C-SOL}$ is maintained at 0% for a while to continue the open converter state, until the answer to step S6 changes from negative to affirmative.

To the contrary, when the vehicle is rapidly decelerated for example in an emergency or panic-stop situation or when the brakes are applied so hard during driving on low-$\mu$ roads, the drive wheels tend to stop turning. In this case, the vehicle speed data Vx will drop below the predetermined coast lock-up turn-off vehicle speed $V_{OFF1}$, and further drop below the predetermined lock-up quick turn-off vehicle speed $V_{OFF2}$ less than the first criterion vehicle speed $V_{OFF1}$. As soon as the vehicle speed data Vx becomes below the second criterion vehicle speed $V_{OFF2}$, the current routine jumps from step S10 directly to step S24, and thus the lock-up control duty ratio $D/T_{T/C-SOL}$ is forcibly reduced down to 0% so as to quickly shift the operating mode of the lock-up clutch to the open converter zone (the lock-up clutch release mode). Exactly speaking, the lock-up clutch is operated at the lock-up moderate release mode, until the vehicle speed Vx becomes less than the predetermined lock-up quick turn-off vehicle speed $V_{OFF2}$ after the vehicle speed Vx equivalent to the mean drive-wheel speed becomes less than the predetermined coast lock-up turn-off vehicle speed $V_{OFF1}$ and thus the condition of step S7 is satisfied. That is to say, at the beginning of the high-level braking period, the lock-up clutch is operated at the lock-up moderate release mode {see the flow from step S1 through steps S2, S5, S7, S10, S22, S25, S27 and S28 to step S11 in the first triggered routine, and see the flow from step Si through steps S2, S5, S6, S9, S10, S22 (on the assumption that the condition of Vx>$V_{OFF2}$ is still satisfied), S26, S29 and S28 (on the assumption that the condition $D/T_{T/Cl-SOL}$>$D/T_{T/C-SOLOFF}$ is still satisfied) to step S11 in the second triggered routine, and see the flow from step S1 through steps S2, S5, S6 and S9 to step S10 in the third triggered routine}. In the third triggered routine, when step S10 determines that the condition of Vx≦$V_{OFF2}$ is satisfied, the operating mode of the lock-up clutch is shifted from the lock-up moderate release mode to the lock-up quick release mode (see the flow from step S10 through steps S24 and S30 to step S28 in the third triggered routine). In this manner, during high-level braking, the operating mode of the lock-up clutch can be momentarily set to the lock-up moderate release mode at the beginning of the high-level braking period, and be soon shifted to the lock-up quick release mode under the condition of Vx≦$V_{OFF2}$.

As is generally known, the engine speed NE is also reduced rapidly with the drive-wheel speed decreasing abruptly during high-level braking in an emergency or panic-stop situation or during hard braking on low-μ roads. Under such a condition, supposing that the lock-up clutch continues to operate at the lock-up moderate release mode and is still in the partially-engaged state, the torque converter 3 would internally slip owing to back torque-flow directed from the drive wheels to the engine during high-level braking, and thus the engine speed $N_E$ drops remarkably due to internal slippage of the torque converter, resulting from the back torque and the lock-up clutch partially engaged, and tends to easily drop below the previously-noted engine stall speed $N_{ELIM}$. According to the system of the embodiment, during the high-level braking, the operating mode of the lock-up clutch can be switched to the lock-up quick release mode quickly as soon as the condition of Vx≦$V_{OFF2}$ is satisfied. This effectively avoids engine stall.

Figure 6A:
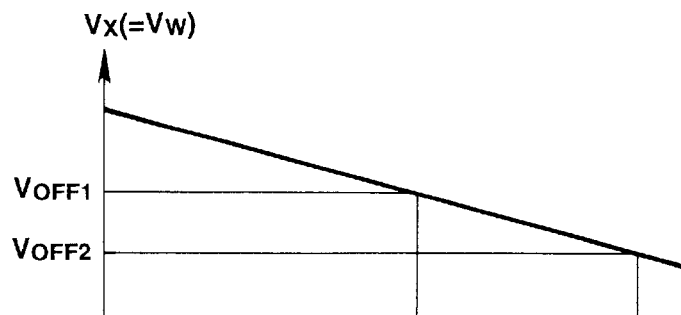
FIGS. 6A, 6B, and 6C are timing charts showing changes in the apply pressure ($P_{T/C\text{-}AP}$) and changes in the release pressure ($P_{T/C\text{-}RE}$), and changes in an engine speed ($N_E$) during light braking (during normal deceleration with a comparatively low deceleration rate), and at 6C a characteristic curve obtained by the system of the present invention is indicated by a solid line, while a characteristic curve of the prior art system is indicated by a two-dotted line.
Figure 6B:
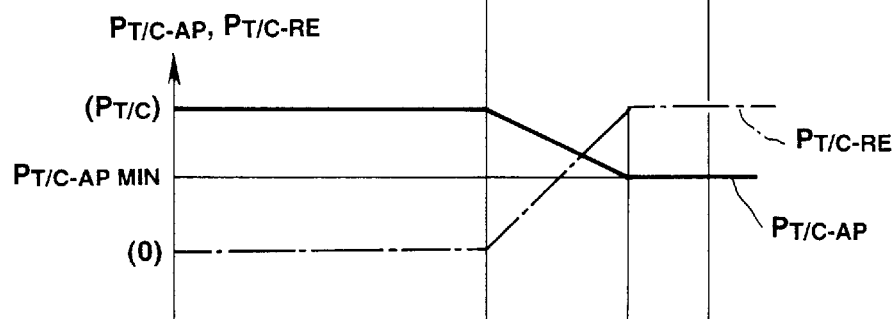
Figure 6C:
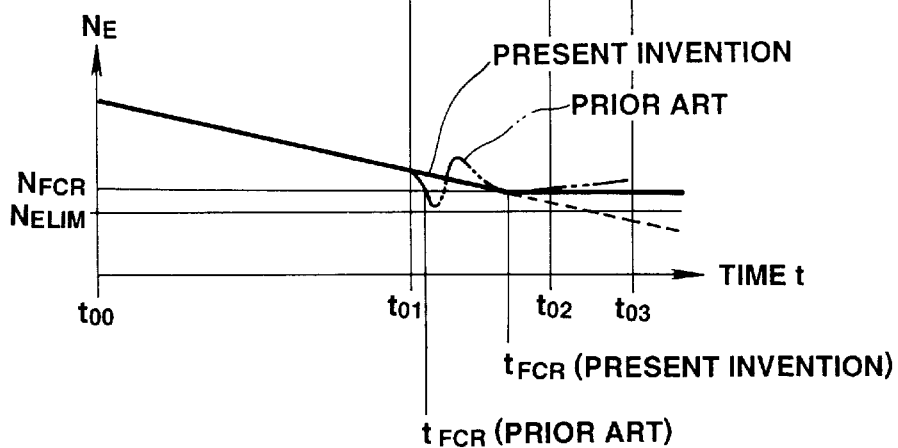

The operation of the system of the embodiment during normal braking (during low-level braking or light braking) is explained hereunder by reference to FIGS. 6A, 6B and 6C.

As seen in FIG. 6A, the vehicle speed Vx (substantially equivalent to the mean drive-wheel speed Vw) is gradually decreased during the low-level braking. The time period from the time ($t_{01}$) when the predetermined coast lock-up turn-off vehicle speed $V_{OFF1}$ is reached to the time ($t_{03}$) when the predetermined lock-up quick release (turn-off) vehicle speed $V_{OFF2}$ is reached, is relatively long, as compared with during high-level braking (see FIG. 7A). During low-level braking, the absolute value |dVw/dt| of the derivative dVw/dt, which is the time rate of change of the mean drive-wheel speed Vw with respect to t (time), is relatively small. As shown in FIG. 6B, the apply pressure $P_{T/C-AP}$ begins to reduce from the time $t_{01}$ where the vehicle speed Vx becomes less than the predetermined coast lock-up turn-off vehicle speed $V_{OFF1}$, whereas the release pressure $P_{T/C-RE}$ begins to increase from the time $t_{01}$. In this manner, during the low-level braking, the system of the embodiment begins to execute the lock-up moderate release (turn off) mode from the time $t_{01}$. On the other hand, the engine speed $N_E$ decreases gradually due to the light-braking action. During the low-level braking, the moderate lock-up release mode can be continuously executed until the time $t_{02}$. This time $t_{02}$ corresponds to the time when the controlled duty ratio $D/T_{T/Cl-SOL}$ becomes below the predetermined solenoid turn-off duty ratio $D/T_{T/C-SOLOFF}$ and thus the apply pressure $P_{T/C-AP}$ reaches the predetermined minimum apply-pressure value $P_{T/C-APMIN}$ and also the release pressure $P_{T/C-RE}$ reaches the converter pressure $P_{T/C}$ through several lock-up moderate release cycles executed every predetermined sampling time intervals ΔT. Therefore, the engine speed $N_E$ is prevented from being abruptly dropped below the fuel-recovery engine speed $N_{FCR}$. In the automotive vehicle with the electronically-controlled engine having a fuel cutoff unit which can operate at a so-called coast fuel-cutoff mode to temporarily shut off fuel supply to fuel injectors during vehicle coasting in order to insure a better engine braking response and to improve fuel economy, the fuel-recovery mode is executed at the time $t_{FCR}$ (corresponding to the fuel-recovery timing in the system of the present invention) close to the time $t_{02}$ with the gradual decrease of the engine speed $N_E$ (see the solid line of FIG. 6C). In contrast to the above, hitherto, the fuel-recovery mode is executed at the time $t_{FCR}$ (corresponding to the fuel-recovery timing in a prior art system) close to the time $t_{01}$ (corresponding to a quick-release start timing based on an engagement-to-disengagement threshold value in the prior art system) with a rapid drop of the engine speed $N_E$ (see the two-dotted line of FIG. 6C). In the prior art system, there is a remarkable hunting just after the fuel-recovery timing $t_{FCR}$ close to the time $t_{01}$. As can be appreciated from comparison between the two simulated engine-speed characteristic curves indicated by the solid line (present invention) and by the two-dotted line (prior art) shown in FIG. 6C, in the system of the embodiment, the engine speed $N_E$ can be reduced gradually smoothly until the time $t_{01}$ and there are less positive and negative fluctuations in the engine speed $N_E$ without any undesired hunting (undershoot and overshoot) of the system from the fuel-recovery timing $t_{FCR}$ near the time $t_{02}$. In this manner, since the system of the embodiment can prevent undesired hunting after shifting to the fuel-recovery mode, uncomfortable acceleration feeling can be eliminated during the fuel-recovery period.

Figure 7A:
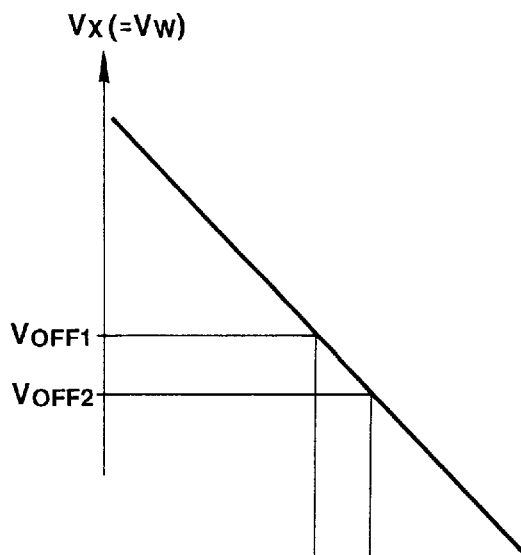
FIGS. 7A, 7B, and 7C are timing charts showing changes in the apply pressure ($P_{T/C\text{-}AP}$) and changes in the release pressure ($P_{T/C\text{-}RE}$), and changes in an engine speed ($N_E$) during hard braking with a comparatively high deceleration rate in an emergency or panic-stop situation, or during quick deceleration on low-$\mu$ roads (resulting in a quick drop in the drive-wheel speed), and at 7C a characteristic curve indicated by the solid line is obtained by a lock-up quick release mode executable subsequently to a moderate release mode in the system of the present invention, while a characteristic curve indicated by the two-dotted line is obtained by only the lock-up moderate release mode.
Figure 7B:
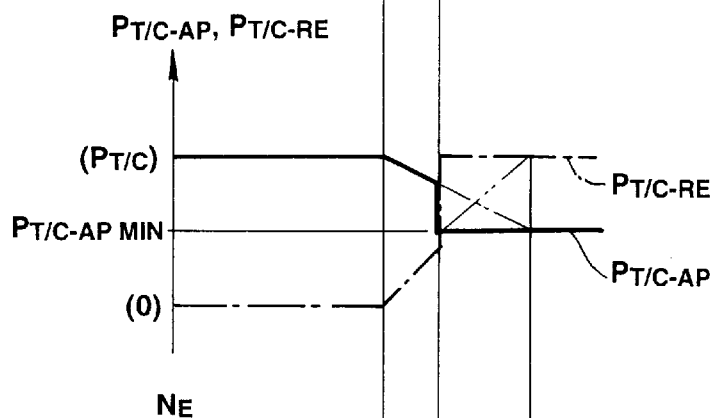
Figure 7C:
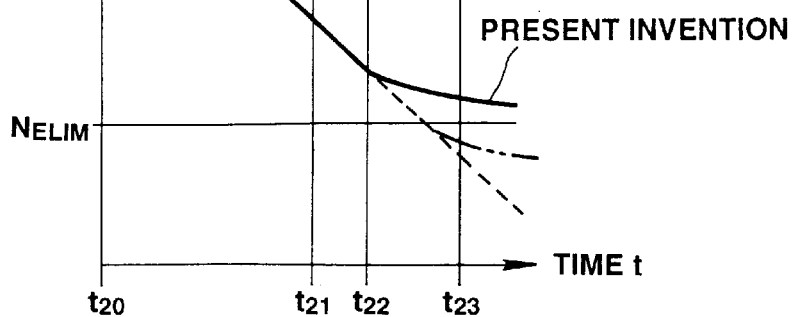

The operation of the system of the embodiment during hard braking (during high-level braking in an emergency or panic-stop situation or during hard braking on low-μroads) is explained hereunder by reference to FIGS. 7A, 7B and 7C.

As seen in FIG. 7A, the vehicle speed Vx (substantially equivalent to the mean drive-wheel speed Vw) is rapidly decreased during the high-level braking. Necessarily, the time period from the time ($t_{21}$) when the predetermined coast lock-up turn-off vehicle speed $V_{OFF1}$ is reached to the time when the predetermined lock-up quick release (turn-off) vehicle speed $V_{OFF2}$ is reached, is relatively short, as compared with during low-level braking (see FIG. 6A). During high-level braking, the absolute value |dVw/dt| of the derivative dVw/dt, is relatively great. As can be appreciated from the timing charts of FIGS. 7A to 7C, if the system merely executes the lock-up moderate release mode from the time $t_{21}$ when the detected vehicle speed Vx reaches the predetermined coast lock-up turn-off vehicle speed $V_{OFF1}$, the shifting of the controlled duty ratio $D/T_{T/C-SOL}$ to 0% is retarded until the time $t_{23}$. This time $t_{23}$ corresponds to the time when the controlled duty ratio $D/T_{T/C-SOL}$ becomes below the predetermined solenoid turn-off duty ratio $D/T_{T/Cl-SOLOFF}$ and thus the apply pressure $P_{T/C-AP}$ reaches the predetermined minimum apply-pressure value $P_{T/C-APMIN}$ and the release pressure $P_{T/C-RE}$ reaches the converter pressure $P_{T/C}$ by way of only the lock-up moderate release cycles executed every predetermined time intervals ΔT. If the full disengagement timing is retarded owing to the use of the lock-up moderate release mode, the rotational motion of the engine may be greatly affected by a power-train inertia containing rotational inertia of the drive wheels, so that the engine speed $N_E$ drops below the engine stall speed $N_{ELIM}$ and engine stall takes place (see the characteristic curve indicated by the two-dotted line shown in FIG. 7C). Actually, during high-level braking, the system of the embodiment can provide the combined operating modes, that is, a rapid shift from the lock-up moderate release mode to the lock-up quick release mode. That is, during high-level braking, the system of the embodiment operates to shift from the lock-up moderate release mode rapidly to the lock-up quick release mode (see the flow from step S10 to step S24), as soon as the vehicle speed Vx becomes less than the predetermined lock-up quick release (turn-off) vehicle speed $V_{OFF2}$ at the time $t_{22}$ earlier than the time $t_{23}$ (see the characteristic curve indicated by the solid line shown in FIG. 7C). When shifting to the lock-up quick release mode, the controlled duty ratio $D/T_{T/C\text{-}SOL}$ is forcibly shifted to 0%, and as a result the release pressure $P_{T/C\text{-}RE}$ rises rapidly to the converter pressure $P_{T/C}$ and the apply pressure $P_{T/C\text{-}AP}$ drops rapidly to the predetermined minimum apply-pressure value $P_{T/C\text{-}APMIN}$ (see the stepped portion of FIG. 7B at the time $t_{22}$). Thus, the engine is uncoupled from the transmission output shaft to assure the lock-up clutch release state. The rapid shifting to the lock-up quick release mode at the time $t_{22}$ (the previously-discussed properly combined moderate and quick lock-up release modes) avoids the engine speed $N_E$ from being dropped below the engine stall speed $N_{ELIM}$. This effectively prevents undesired engine stall.

Figure 8:
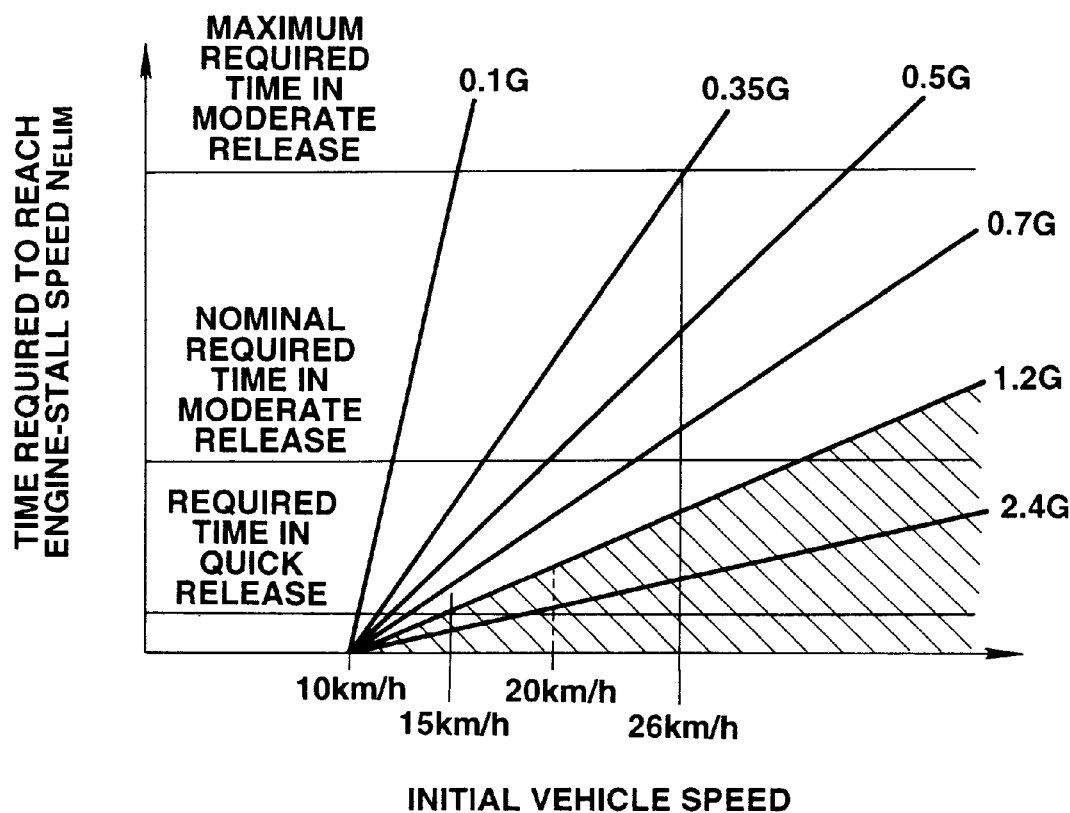
FIG. 8 is a graph illustrating the relationship between an initial vehicle speed and a time required to reach an engine-stall speed ($N_{ELIM}$) at various deceleration rates, and being usable for setting two necessary threshold values (two different criterion vehicle speeds), namely a first predetermined vehicle speed $V_{OFF1}$ determining a lock-up moderate release (turn-off) timing and a second predetermined vehicle speed $V_{OFF2}$ determining a lock-up quick release (turn-on) timing.

Hereunder explained in detail by reference to FIG. 8, is a method for setting the previously-noted two criterion vehicle speeds, namely the predetermined coast lock-up turn-off vehicle speed $V_{OFF1}$ and the predetermined lock-up quick turn-off vehicle speed $V_{OFF2}$. The test results shown in FIG. 8 is experimentally assured by the inventors of the present invention. A point of the initial vehicle speed of 10 km/h means the point where the rotational motion of the engine could be greatly affected by the power train inertia containing rotational inertia of the drive wheels and thus the engine would stall in the full lock-up state without any depression of the accelerator pedal. The vehicle speed of 10 km/h can be generally regarded as a vehicle speed equivalent to the engine stall speed $N_{ELIM}$. FIG. 8 shows a time required to reach the engine-stall speed $N_{ELIM}$ at various deceleration rates (−0.1G, −0.35G, −0.5G, −0.7G, −1.2G and −2.4G) when decelerating from various initial vehicle speeds (15 km/h, 20 km/h, 26 km/h, or the like). Actually the deceleration rate is a negative rate, however, for convenience the deceleration rate is indicated as positive in FIG. 8. Of these deceleration rates, a specific deceleration rate of −0.35G substantially corresponds to a deceleration rate at which braking is held to just below the point where wheel-lock would start when a standard automobile such as a usual passenger car is traveling on high-μ roads. That is, the specific deceleration rate of −0.35G corresponds to the maximum deceleration rate so that the maximum braking effect is obtained without locking road wheels during driving on high-μ roads. The hatched zone of FIG. 8, having deceleration rates above a deceleration rate of −1.2G corresponds to a high deceleration rate zone, that is during hard braking in an emergency or panic-stop situation or during quick braking on low-μ roads. Even when the lock-up clutch is operated at the lock-up quick release mode, there is a delay time (a required time for shifting from the lock-up state to the full release state). In FIG. 8, the lower horizontal line indicates the required time (the delay time) for shifting from the lock-up state to the full release state when the lock-up clutch is quickly disengaged. On the other hand, when the lock-up clutch is operated at the lock-up moderate release mode, a required time for shifting the full lock-up state to the release state tends to fluctuate somewhat among produced lock-up devices. In FIG. 8, the upper horizontal line indicates the maximum required time of fluctuations of required times of tested lock-up devices, obtained when moderately disengaging. The intermediate horizontal line indicates the nominal required time for shifting to the release state. As can be appreciated from FIG. 8, for example when the lock-up clutch is quickly released while decelerating at the deceleration rate of −1.2G from the initial vehicle speed of 15 km/h, the engine never stalls, because the lock-up clutch is completely quickly released before the vehicle speed Vx (substantially equivalent to the means drive wheel speed Vw) reaches to a vehicle speed equivalent to the engine stall speed $N_{ELIM}$. When the lock-up clutch is quickly released while decelerating at the deceleration rate of −2.4G from the initial vehicle speed of 20 km/h, the engine does not yet stall, because the lock-up clutch can be completely quickly released before the vehicle speed Vx reaches to a vehicle speed equivalent to the engine stall speed $N_{ELIM}$. As a further example, when the lock-up clutch is moderately released while decelerating at the specific deceleration rate of −0.35G, obtainable without wheel-lock during driving on high-μ roads, from the initial vehicle speed of 26 km/h, the lock-up clutch can be completely disengaged irrespective of the previously-discussed fluctuations of required time, before the engine stalls. That is to say, a predetermined lock-up quick release (turn-off) vehicle speed $V_{OFF2}$ can be properly reasonably set or determined by way of the selection of the initial vehicle speed satisfying a necessary condition in which a required time for decelerating the vehicle speed Vx from the lock-up quick release vehicle speed $V_{OFF2}$ to a vehicle speed (e.g., 10 km/h) equivalent to the engine stall speed $N_{ELIM}$ at a particular preselected high deceleration rate (e.g., −2.4G), is somewhat greater than a required time (a delay time) necessary for shifting to the full disengagement state from initiation of the lock-up quick turn-off mode after the vehicle speed Vx drops just below the predetermined lock-up quick release vehicle speed $V_{OFF2}$. In the shown embodiment, although 10 km/h is selected as a vehicle speed equivalent to the engine stall speed $N_{ELIM}$ and −2.4G is selected as a representative high deceleration rate necessary for properly setting the predetermined lock-up quick release vehicle speed $V_{OFF2}$, these values are different depending on various factors, such as various kinds of automobiles, the size, entire weight, and torque-converter capacity of the automotive vehicle, and the like. Therefore, it will be understood that a lock-up quick release vehicle speed $V_{OFF2}$ required for avoidance of engine-stall is 20 km/h, when rapidly decelerating at the comparatively high deceleration rate of −2.4G. On the other hand, a predetermined coast lock-up moderate release (turn-off) vehicle speed $V_{OFF1}$ can be properly reasonably set or determined by way of the selection of the initial vehicle speed satisfying a necessary condition in which a required time ($t_{01}$−$t_{03}$) for decelerating the vehicle speed Vx from the lock-up moderate release vehicle speed $V_{OFF1}$ to the predetermined lock-up quick release vehicle speed $V_{OFF2}$ (e.g., 20 km/h) at a specific preselected low deceleration rate (e.g., −0.35G), is somewhat greater than a required time ($t_{01}$−$t_{02}$) for moderately shifting the lock-up clutch from the full lock-up state to the full release state during the lock-up moderate release mode, initiated as soon as the vehicle speed Vx drops just below the predetermined coast lock-up moderate release vehicle speed $V_{OFF1}$. In the shown embodiment, −0.35G is selected as a representative low deceleration rate necessary for properly setting the predetermined coast lock-up moderate release vehicle speed $V_{OFF1}$. It will be understood that a coast lock-up moderate release vehicle speed $V_{OFF1}$ required for avoidance of engine-stall is 26 km/h when moderately decelerating at the comparatively low deceleration rate of −0.35G, accounting for the use of only the lock-up moderate release mode. That is, if the lock-up moderate release mode is initiated as soon as the vehicle speed Vx drops just below the predetermined coast lock-up release vehicle speed $V_{OFF1}$ (e.g., 26 km/h) during light braking, the lock-up clutch can be completely timely disengaged without shifting to the lock-up quick release mode, before the vehicle speed Vx reaches the predetermined lock-up quick release vehicle speed $V_{OFF2}$. Thus, the proper setting of the coast lock-up turn-off vehicle speed $V_{OFF1}$ ensures smooth releasing action of the lock-up during light braking. It is preferable to set the lock-up quick release vehicle speed $V_{OFF2}$ to a predetermined low vehicle speed as close to a minimum value as possible in which the lock-up clutch can be completely disengaged without stalling the engine, when the lock-up quick release mode is executed during high-level braking with a comparatively high deceleration rate of 2.4G (absolute value). The more preferable setting of the lock-up quick release vehicle speed $V_{OFF2}$ insures avoidance of undesired engine stall to the very limit (the pre-selected high deceleration rate of −2.4G). As per the setting of the predetermined coast lock-up turn-off vehicle speed $V_{OFF1}$, it is necessary to consider both a proper lock-up turn-off timing (contributing to improvement in fuel economy) and a proper hysteresis (response difference) between the lock-up turn-on ($L_{ON}$) and turn-off ($L_{OFF1}$) characteristics. Therefore, It is preferable to set the coast lock-up turn-off vehicle speed $V_{OFF1}$ to a predetermined low vehicle speed greater than the vehicle-speed threshold $V_{OFF2}$ and as close to a minimum value as possible in which the lock-up clutch can be completely disengaged before the vehicle speed Vx reaches the predetermined lock-up quick release vehicle speed $V_{OFF2}$, when the lock-up moderate release mode is executed during low-level braking with a comparatively low deceleration rate of 0.35G (absolute value). Therefore, with the previously-discussed proper setting of the coast lock-up turn-off vehicle speed $V_{OFF1}$, the operating mode of the lock-up clutch cannot be shifted to the quick release mode within a range of deceleration produced during normal braking and also there is no risk of stalling the engine. In this manner, after properly setting or determining the two vehicle-speed thresholds $V_{OFF1}$ and $V_{OFF2}$, a coast lock-up turn-on vehicle speed $V_{ON0}$ is determined accounting for the proper hysteresis or response difference. The required time for shifting from the full lock-up state to the full release state, that is, the responsiveness of the lock-up device, is affected by the viscosity of internal working fluid in the lock-up torque converter 3. As appreciated in FIG. 5, the viscosity increases as the temperature of working fluid decreases. During cold weather, the responsiveness of the lock-up device is lowered, and thus the required time for shifting to the full release state tends to increase. Accounting for temperature dependency of the viscosity of working fluid, the lock-up quick release vehicle speed $V_{OFF2}$ must be set to a higher value as the coolant temperature Tw (equivalent to the internal working fluid of the torque converter and used to sense the actual operating temperature of the engine) decreases (see the map shown in FIG. 5).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A releasable coupling control system in combination with an electronic engine control unit which executes a fuel cutoff mode during vehicle deceleration and a fuel-supply recovery mode as soon as an engine speed drops below a predetermined threshold value, for controlling engaging and disengaging operations of a releasable coupling device placed in an automotive power train between an engine and drive wheels, comprising:

a wheel-speed sensor for detecting a drive-wheel speed to generate a drive-wheel speed indicative signal; and a controller being configured to be responsive to said drive-wheel speed indicative signal for moderately releasing said releasable coupling device at a moderate turn-off mode where said releasable coupling device is moderately released at a predetermined time rate of change of disengagement, when the drive-wheel speed indicative signal value drops below a first predetermined value, and for quickly releasing said releasable coupling device at a quick turn-off mode where said releasable coupling device is quickly released by quickly fixing an apply pressure to a predetermined low pressure value and by quickly fixing a release pressure to a predetermined high pressure value, when the drive-wheel speed indicative signal value drops below a second predetermined value less than the first predetermined value.

2. The releasable coupling control system as claimed in claim 1, wherein said first predetermined value is set at a value satisfying a necessary condition in which the engine is prevented from stalling by moderately releasing said releasable coupling device from a time when the drive-wheel speed indicative signal value becomes below said first predetermined value while decelerating the drive wheels at a first preselected deceleration rate, and wherein said second predetermined value is set at a value satisfying a necessary condition in which the engine is prevented from stalling by quickly releasing said releasable coupling device from a time when the drive-wheel speed indicative signal value becomes below said second predetermined value while decelerating the drive wheels at a second preselected deceleration rate greater than said first preselected deceleration rate.

3. The releasable coupling control system as claimed in claim 2, wherein said first predetermined value is determined as a vehicle speed satisfying a necessary condition in which a required time for decelerating the drive-wheel speed from said first predetermined value to said predetermined second value at the first preselected low deceleration rate is greater than a required time for moderately shifting said releasable coupling device from a full engagement state to a full disengagement state during the moderate turn-off mode initiated as soon as the drive-wheel speed drops just below said first predetermined value, and wherein said second predetermined value is determined as a vehicle speed satisfying a necessary condition in which a required time for decelerating the drive-wheel speed from said second predetermined value to a vehicle speed equivalent to an engine stall speed at the second preselected high deceleration rate is greater than a delay time necessary for shifting to the full disengagement state from initiation of the quick turn-off mode after said second predetermined value has been reached.

4. The releasable coupling control system as claimed in claim 2, wherein said first predetermined value is set to a predetermined low vehicle speed greater than said predetermined second value and as close to a minimum value as possible in which said releasable coupling device is completely disengaged by moderately releasing said releasable coupling device from the time when the drive-wheel speed indicative signal value becomes below said first predetermined value while decelerating the drive wheels at the first preselected deceleration rate, before said second predetermined value is reached.

5. The releasable coupling control system as claimed in claim 4, wherein said second predetermined value is set to a predetermined low vehicle speed as close to a minimum value as possible in which said releasable coupling device is completely disengaged without stalling the engine by quickly releasing said releasable coupling device from the time when the drive-wheel speed indicative signal value becomes below said second predetermined value while decelerating the drive wheels at the second preselected deceleration rate.

6. The releasable coupling control system as claimed in claim 1, wherein said second predetermined value is set at a lower value as a temperature of working fluid used to hydraulically operate said releasable coupling device increases.

7. The releasable coupling control system as claimed in claim 6, wherein said releasable coupling device is a torque converter lock-up clutch.

8. The releasable coupling control system as claimed in claim 6, wherein said releasable coupling device is a start clutch.

* * * * *